W. E. SCHWARZMANN.
BRUSH HOLDER FOR MAGNETOS.
APPLICATION FILED OCT. 26, 1918.
1,322,505.
Patented Nov. 18, 1919.
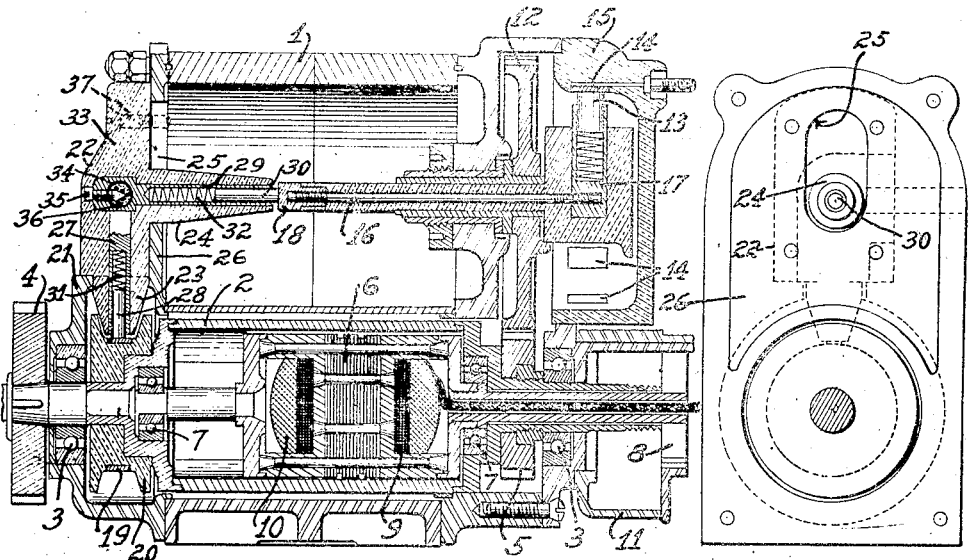
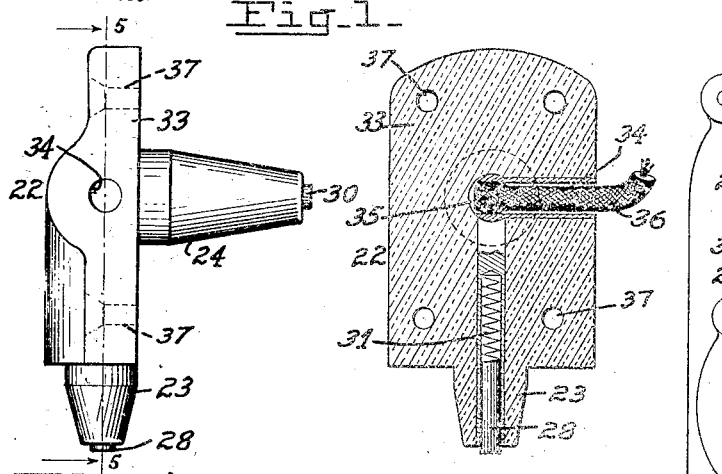
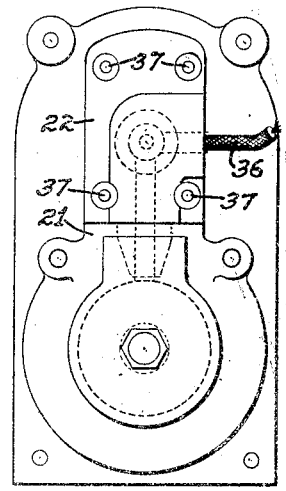
Inventor
Wolfgang E. Schwarzmann
By his Attorney

UNITED STATES PATENT OFFICE.

WOLFGANG ERNEST SCHWARZMANN, OF SPRINGFIELD, MASSACHUSETTS, ASSIGNOR, BY MESNE ASSIGNMENTS, TO AMERICAN BOSCH MAGNETO CORPORATION, OF NEW YORK, N. Y., A CORPORATION OF NEW YORK.

BRUSH-HOLDER FOR MAGNETOS.

1,322,505.   Specification of Letters Patent.   Patented Nov. 18, 1919.

Application filed October 26, 1918. Serial No. 259,751.

*To all whom it may concern:*

Be it known that I, WOLFGANG E. SCHWARZMANN, a citizen of the United States, residing at Long Meadow, Springfield, in the county of Hampden, State of Massachusetts, have invented certain new and useful Improvements in Brush-Holders for Magnetos; and I do hereby declare the following to be a full, clear, and exact description of the invention, such as will enable others skilled in the art to which it appertains to make and use the same.

The present invention relates to brush holders for magnetos, and particularly to magnetos of the inclosed type having a collector ring at one end and a distributer at the other end electrically connected thereto through the arch of the magnet of the magneto.

Heretofore it was customary to have an end plate entirely covering the collector end of the magneto and inclosing the brush holder, so that not only was the weight increased but to inspect, repair or replace the brushes, the end plate had to be first removed. Furthermore, where an outside conductor was used, as for a wireless transmitting set, a bushing through the end plate had to be provided in order to maintain the magneto dust-tight.

In accordance with my invention, the brush holder is fastened to the end plate on the outside thereof on the collector end of the magneto in position to close an opening into the collector housing and an opening through the end plate into the arch of the magneto. In the preferred construction described hereinafter, the brush holder has a lower vertical branch extending into the collector housing and carrying a brush in engagement with the collector ring therein, and an intermediate horizontal branch carrying a brush in engagement with the rotatable end of the distributer rod in the arch of the magnet of the magneto, an upper vertical portion being provided to close the end plate opening which is of sufficient height for raising the lower vertical branch clear of the collector housing. Furthermore, the lower vertical branch and the intermediate horizontal branch have brush guides which are joined at their inner ends to complete the electrical connection between the brushes therein, while the brush holder has a bore extending to the junction of the guides for connection thereto of an outside conductor. Thus besides simplifying the construction, the brush holder may be readily removed at any time to expose the collector ring and the distributer rod, as well as the brushes and the fastening of the outside conductor, for purposes of inspection, repair or replacement thereof.

In the accompanying drawings illustrating this preferred form of construction in application, as an example, to a magneto of the sleeve type, Figure 1 is a transverse section of the magneto; Fig. 2 is a view of the end plate alone from the inside; Fig. 3 is a view of the collector end of the magneto with the magneto gear removed; Fig. 4 is a side view of the brush holder alone; and Fig. 5 is a section on line 5—5 of Fig. 4.

The magneto has the magnets 1 of arch form, the sleeve 2 rotatable in bearings 3 and carrying the magneto gear 4 and the distributer pinion 5, and the armature 6 held in the bearing 7 by the locking disk 8 and having a generating winding comprising the primary turns 9 and the secondary turns 10. The mechanical interrupter may be of any suitable kind mounted in the housing 11. The distributer consists of the distributer gear 12 carrying the brush 13 in engagement with the spark-plug distributing contacts 14 in the distributer block 15. The gear 12 also carries the distributer rod having an embedded conductor 16 connected at one end to the sleeve 17 holding the brush 13 and at the other end to the metal cap 18. The distributer forms a closure for the arch of the magnets 1 at that end of the magneto.

The insulated terminal of the secondary turns 10 is connected in any suitable way to the collector ring 19, which is embedded in the insulating member 20 arranged in the collector housing 21.

The brush holder 22 has a lower vertical portion 23 extending into the collector housing and closing the opening thereinto, and it also has an intermediate horizontal portion 24 extending through an opening 25 of the end plate 26. Said vertical portion has a bore lined with a metal brush-guide 27 for the brush 28, and likewise said horizontal portion has a bore lined with a metal brush-guide 29 for the brush 30, the two guides being joined at their inner ends to complete the electrical connection between the brushes. The brush 28 is pressed by the spring 31 into sliding contact with the collector ring 19, and the brush 30 is pressed by the spring 32 into contact with the metal cap 18 of the distributer rod. The brush holder further has an upper vertical portion 33 closing the remainder of the opening 25.

The brush holder has a third bore 34 extending to the junction of the two brush guides. The pointed screw 35 passes through the guide and pierces the insulation of the outside conductor 36 so as to connect it to the brush guides and at the same time spread the conductor to close the bore 34 and hold it tightly therein as shown particularly in Fig. 5.

The end plate 26 is bolted in the well known way to the magneto, and the brush holder is screwed at 37 to the end plate. To remove the brush holder for inspection, repair or replacement of the collector ring 19 and the metal cap 18, as well as the brushes 28 and 30, the four screws are removed, and the brush holder is raised until the end of the lower vertical portion 23 clears the top of the collector housing 21, whereupon the brush holder may then be drawn away from the magneto. Upon replacing the brush holder, by first projecting the horizontal branch through the opening 25 and then lowering the brush holder until the lower vertical branch closes the collector housing, the brushes 28 and 30 are properly engaged with the collector ring 19 and the metal cap 18, respectively.

Having thus described my invention, what I claim is:

1. In a magneto, a magnet of arched form, a collector housing having an opening thereinto, an end plate at the collector end of the magneto having an opening therethrough into the arch of the magnet, a brush holder fastened to the end plate on the outside thereof and closing said openings, and brushes carried by the brush holder and extending into the collector housing and into the arch of the magnet.

2. In a magneto, a magnet of arched form, a collector housing having an opening thereinto, an end plate at the collector end of the magneto having an opening therethrough into the arch of the magnet, a brush holder fastened to the end plate on the outside thereof and closing said openings, brushes carried by the brush holder and extending into the collector housing and into the arch of the magnet, and brush guides joined at their inner ends to complete the electrical connection between the brushes.

3. In a magneto, a magnet of arched form, a collector housing having an opening thereinto, an end plate at the collector end of the magneto having an opening therethrough into the arch of the magnet, a brush holder fastened to the end plate on the outside thereof and closing said openings, brushes carried by the brush holder and extending into the collector housing and into the arch of the magnet, and brush guides joined at their inner ends to complete the electrical connection between the brushes, said brush holder having a bore to the junction of the brush guides for the connection thereto of an outside conductor.

4. In a magneto; a magnet of arched form; a collector housing having an opening thereinto; an end plate at the collector end of the magneto having an opening therethrough into the arch of the magnet; a brush holder fastened to the end plate on the outside thereof and having a lower vertical portion extending into the collector housing and closing the opening thereinto, an intermediate horizontal portion extending through the opening in the end plate into the arch of the magnet, and an upper vertical portion covering the remainder of the opening through the end plate; the construction and arrangement being such that, when the brush holder is unfastened from the end plate, the intermediate horizontal portion may be raised sufficiently in the opening through the end plate to withdraw the lower vertical portion from the opening in the collector housing.

5. In a magneto; a magnet of arched form; a collector housing having an opening thereinto; an end plate at the collector end of the magneto and having an opening therethrough into the arch of the magnet; a brush holder fastened to the end plate on the outside thereof and having a lower vertical portion extending into the collector housing and closing the opening thereinto, an intermediate horizontal portion extending through the opening in the end plate into the arch of the magnet, and an upper vertical portion covering the remainder of the opening through the end plate; and brush guides joined at their inner ends and extending into the lower vertical portion and the intermediate horizontal portion respectively to complete the electrical connection between the brushes therein; the construction and arrangement being such that, when the brush holder is unfastened from the end plate, the intermediate horizontal portion of the brush holder may be raised sufficiently in the opening through the end plate to withdraw the lower vertical portion from the opening in the collector housing.

6. In a magneto; a magnet of arched form; a collector housing having an opening thereinto; an end plate at the collector end of the housing having an opening therethrough into the arch of the magnet; a brush holder fastened to the end plate on the outside thereof and having a lower vertical portion extending into the collector housing and closing the opening thereinto, an intermediate horizontal portion extending through the opening in the end plate into the arch of the magnet, and an upper vertical portion covering the remainder of the opening through the end plate; brush guides joined at their inner ends and extending into the lower vertical portion and the intermediate horizontal portion respectively to complete the electrical connection between the brushes therein; said brush holder having a bore to the junction of the brush guides for connection thereto of an outside conductor, and the construction and arrangement being such that the intermediate horizontal portion of the brush holder may be raised sufficiently in the opening through the end plate to withdraw the lower vertical portion from the opening in the collector housing.

In testimony whereof I affix my signature.

WOLFGANG ERNEST SCHWARZMANN.